United States Patent
Ogasawara

(12) 
(10) Patent No.: US 6,512,554 B1
(45) Date of Patent: Jan. 28, 2003

(54) AUTOMATIC GAIN CONTROL CIRCUIT

(75) Inventor: Yutaka Ogasawara, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/320,255

(22) Filed: May 26, 1999

(30) Foreign Application Priority Data

May 28, 1998 (JP) .......................................... 10-146879

(51) Int. Cl.[7] .................................................. H04N 5/52
(52) U.S. Cl. ...................................... 348/678; 348/733
(58) Field of Search ................................ 348/555, 678, 348/679, 735, 731, 732, 733; H04N 5/46, 5/52

(56) References Cited

U.S. PATENT DOCUMENTS 6,377,316 B1 * 4/2002 Mycynek et al. ........... 348/678

FOREIGN PATENT DOCUMENTS

| EP | 0 804 023 A2 | 10/1997 |
|----|--------------|---------|
| JP | 06 205325 | 7/1994 |
| JP | 07 030824 | 1/1995 |
| JP | Hei 8-181556 | 7/1996 |
| JP | 09 107304 | 4/1997 |

* cited by examiner

*Primary Examiner*—Sherrie Hsia
(74) *Attorney, Agent, or Firm*—Brinks Hofer Gilson & Lione

(57) ABSTRACT

An automatic gain control circuit has a tuner for amplifying and IF signal according to an increase or decrease in AGC voltage and outputting it therefrom, first and second detectors for increasing a first control voltage and lowing a second control voltage, respectively, a selector switch for selecting either the first detector or the second detector as a destination to output the IF signal, and a voltage converting circuit for outputting the corresponding AGC voltage therefrom. When the IF signal is inputted to the second detector, the second control voltage is outputted to the tuner, whereas when the IF signal is inputted to the first detector, a voltage corresponding to an increase or decrease in the voltage corresponding to the difference between the maximum voltage outputted from the second detector and the first control voltage is outputted to the tuner.

2 Claims, 1 Drawing Sheet

AUTOMATIC GAIN CONTROL CIRCUIT

BACKGROUND OF THE INVENTION

1. Field of the Invention

The present invention relates to an automatic gain control circuit capable of receiving two broadcast signals of different systems as in a television signal of a digital system and a television signal of an analog system, for example.

2. Description of the Related Art

A prior art automatic gain control circuit will be explained in accordance with FIG. 2. A tuner 21 is a tuner capable of receiving both broadcast signals: a television signal (hereinafter called "analog broadcast signal") of an analog system and a television signal (hereinafter called "digital broadcast signal") of a digital system. The tuner 21 has an intermediate frequency signal output terminal (hereinafter called "IF signal output terminal") 21a and an automatic gain control voltage input terminal (hereinafter called "AGC voltage input terminal") 21b and is electrically connected to an antenna 22. Further, the tuner 21 has a gain variable amplifier 21c, a mixer (not shown) for converting an input broadcast signal into an intermediate frequency signal (hereinafter called "IF signal"), etc. The gain variable amplifier 21c serves as an amplifier capable of varying amplification according to the magnitude of an automatic gain control voltage (hereinafter called "AGC voltage") inputted from the AGC voltage input terminal 21b. When the AGC voltage is high, the amplifier serves so as to increase the amplification.

Further, the analog broadcast signal or digital broadcast signal inputted from the antenna 22 is amplified by the gain variable amplifier 21c according to the magnitude of the AGC voltage and converted into the intermediate frequency signal by the mixer, which in turn is outputted from the IF signal output terminal 21a.

A high-frequency switch 23 is electrically connected to the IF signal output terminal 21a. The high-frequency switch 23 has output terminals 23a and 23b and an input terminal 23c and electrically connects the input terminal 23c to either the output terminal 23a or 23b according to the type of each received broadcast. Further, when the tuner 21 receives the analog broadcast signal therein, the high-frequency switch 23 serves so as to electrically connect the input terminal 23c to the output terminal 23a. When the tuner 21 receives the digital broadcast signal therein, the high-frequency switch 23 serves so as to electrically connect the input terminal 23c to the output terminal 23b. The high-frequency switch 23 can be constructed by means of a switch diode, for example.

A detector 24 for outputting an AGC voltage according to the level of the IF signal when the IF signal is inputted thereto, and a demodulator 25 for outputting a voice or speech signal and a video signal from the IF signal of the analog broadcast signal are electrically connected to the output terminal 23a. Thus, the IF signal is to be inputted to both the detector 24 and the demodulator 25.

Here, the detector 24 outputs the AGC voltage to be outputted therefrom as high as practicable when the input IF signal is low in level. On the other hand, when the input IF signal is high in level, the detector 24 outputs the AGC voltage to be outputted therefrom as low as practicable. Further, the AGC voltage outputted from the detector 24 is to be inputted to the AGC voltage input terminal 21b of the tuner 21 through an automatic gain control voltage selector switch (hereinafter called "AGC voltage selector switch") 26.

Similarly, a detector 27 for outputting an AGC voltage when the IF signal is inputted thereto, and a demodulator 28 for outputting a voice or speech signal and a video signal from the IF signal of the digital broadcast signal are electrically connected to the output terminal 23b. Thus, the IF signal is to be inputted to both the detector 27 and the demodulator 28.

Here, the detector 27 outputs the AGC voltage to be outputted therefrom as high as practicable when the level of the input IF signal is low, whereas when the level of the input IF signal is high, the detector 27 outputs the AGC voltage to be outputted therefrom as low as practicable. Further, the AGC voltage outputted from the detector 27 is to be inputted to the AGC voltage input terminal 21b of the tuner 21 through the AGC voltage selector switch 26.

The AGC voltage selector switch 26 performs switching in interlock with the high-frequency switch 23 so that the AGC voltage outputted from the detector 24 or 27 is inputted to the gain variable amplifier 21c of the tuner 21. The AGC voltage selector switch 26 has input terminals 26a and 26b and an output terminal 26c and electrically connects the output terminal 26c to either the input terminal 26a or 26b according to each received broadcast. When the tuner 21 receives the analog broadcast signal therein, the AGC voltage selector switch 26 electrically connects the output terminal 26c to the input terminal 26a. When the tuner 21 receives the digital broadcast signal therein, the AGC voltage selector switch 26 electrically connects the output terminal 26c to the switching terminal 26b. Since it is difficult to construct the AGC voltage selector switch 26 by a switch diode, for example, a relay or the like is used for the AGC voltage selector switch 26.

Since the AGC voltage outputted from the detector 24 increases when the level of the analog broadcast signal is lowered upon receiving the analog broadcast signal, for example, the amplification of the gain variable amplifier 21c of the tuner 21 is made high and hence the level of the IF signal to be outputted is set so as to be kept constant, whereby suitable speech and video signals are obtained.

In the same manner as described above even when the digital broadcast signal is received, since the AGC voltage outputted from the detector 27 increases when the level of the digital broadcast signal is lowered, the amplification of the gain variable amplifier 21c of the tuner 21 is made high and hence the level of the IF signal to be outputted is set so as to be held constant, whereby suitable speech and video signals are obtained.

Since, however, the prior art is constructed so that both the analog broadcast signal and the digital broadcast signal can be received by one tuner, it is necessary to perform the switching between the high-frequency switch 23 and the AGC voltage selector switch 26 in interlock with each other according to each received signal.

Therefore, the high-frequency switch 23 can be easily constructed by means of the switch diode. Since, however, the AGC voltage selector switch 26 is switched over by using mechanical switch means such as the relay or the like, a problem arises in that, for example, a rise in the cost thereof occurs and its wide installation location is needed.

SUMMARY OF THE INVENTION

With the foregoing problems in view, it is accordingly an object of the present invention to allow switching between AGC voltages owing to a simpler configuration without using the mechanical switch means for the AGC voltage selector switch 26 and without any restriction on its installation location and at low cost.

According to one aspect of this invention, for achieving the above object, there is provided an automatic gain control circuit, comprising: a tuner capable of receiving broadcast signals of different systems and for amplifying an intermediate frequency signal according to an increase or decrease in automatic gain control voltage when the automatic gain control voltage is inputted thereto and outputting the same therefrom; a first detector for outputting a first control voltage increased as the level of the intermediate frequency signal increases, when the intermediate frequency signal is inputted thereto; a second detector for outputting a second control voltage maximal when the intermediate frequency signal is not inputted thereto and lowered as the level of the intermediate frequency signal increases when the intermediate frequency signal is inputted thereto; a selector switch for selecting either the first detector or the second detector as a destination to output the intermediate frequency signal according to the received broadcasts; and a voltage converting circuit for receiving the first control voltage and the second control voltage therein and thereby outputting the automatic gain control voltage therefrom, and wherein when the intermediate frequency signal is inputted to the second detector, the second control voltage is outputted to the tuner as the automatic gain control voltage, and when the intermediate frequency signal is inputted to the first detector, a voltage increased or decreased according to an increase or decrease in the voltage corresponding to the difference between the maximum second control voltage outputted from the second detector and the first control voltage is outputted to the tuner as the automatic gain control voltage.

Further, according to the automatic gain control circuit of the present invention, the voltage converting circuit comprises a first resistor, a second resistor and a transistor, and one end of the first resistor is electrically connected to the collector of the transistor and the emitter of the transistor is grounded via the second resistor, and the second control voltage is inputted to the other end of the first resistor and the first control voltage is inputted to the base of the transistor, whereby the automatic gain control voltage is outputted from the collector of the transistor.

A typical one of the present invention has been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DESCRIPTION OF THE PREFERRED EMBODIMENTS

Figure 1:
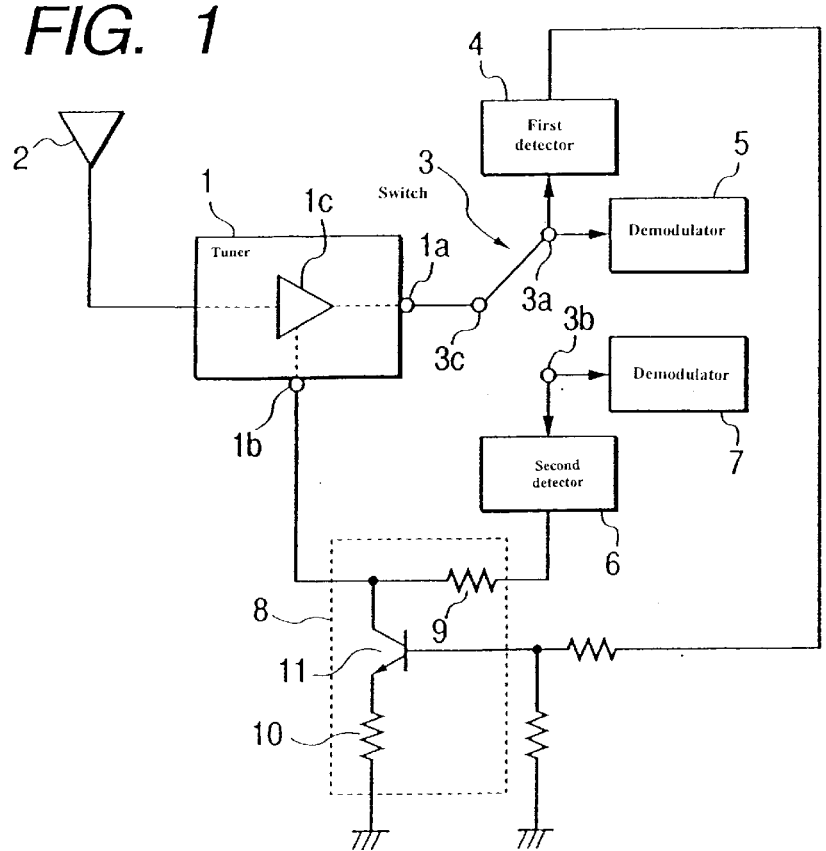
FIG. 1 is a diagram showing an automatic gain control circuit according to the present invention.
Figure 2:
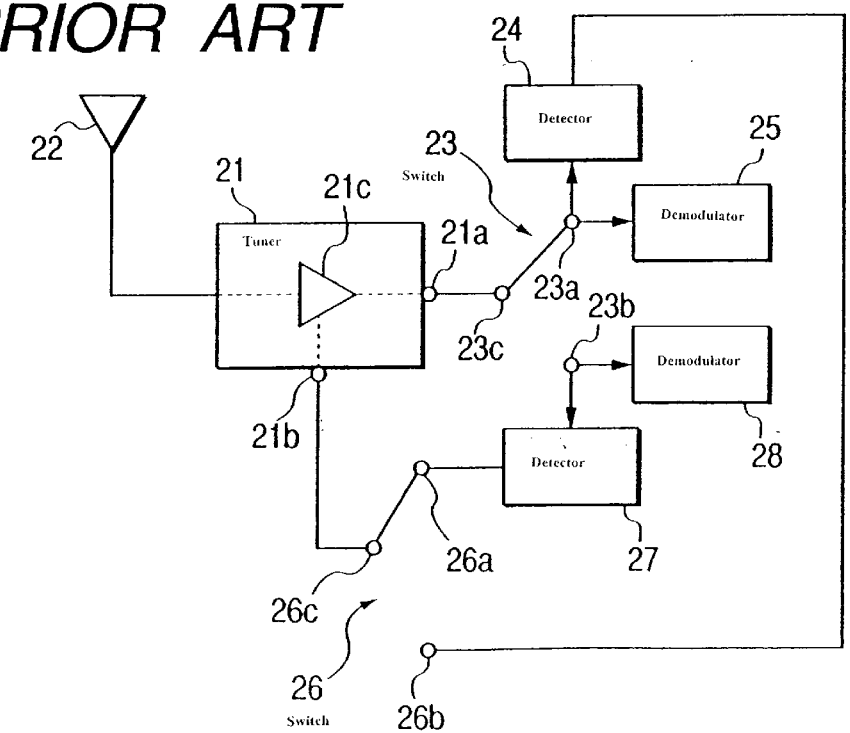
FIG. 2 is a diagram illustrating a conventional automatic gain control circuit.

An automatic gain control circuit according to the present invention will be explained with reference to FIG. 1. A tuner 1 is a tuner capable of receiving both broadcast signals of a television signal (hereinafter called "analog broadcast signal") of an analog system and a television signal (hereinafter called "digital broadcast signal") of a digital system. The tuner 1 has an intermediate frequency signal output terminal (hereinafter called "IF signal output terminal") 1a and an automatic gain control voltage input terminal (hereinafter called "AGC voltage input terminal") 1b and is electrically connected to an antenna 2. Further, the tuner 1 includes a gain variable amplifier 1c, a mixer (not shown) for converting an input broadcast signal into an intermediate frequency signal (hereinafter called "IF signal"), etc. The gain variable amplifier 1c serves as an amplifier capable of varying amplification according to the magnitude of an automatic gain control voltage (hereinafter called "AGC voltage") inputted from the AGC voltage input terminal 1b. When the AGC voltage is low, the amplifier serves so as to increase the amplification.

Further, the analog broadcast signal or digital broadcast signal inputted from the antenna 2 is amplified by the gain variable amplifier 1c according to the magnitude of the AGC voltage and converted into the intermediate frequency signal by the mixer, which in turn is outputted from the IF signal output terminal 1a.

A high-frequency switch 3 is electrically connected to the IF signal output terminal 1a. The high-frequency switch 3 has output terminals 3a and 3b and an input terminal 3c and electrically connects the input terminal 3c to either the output terminal 3a or 3b according to the type of received broadcast. Further, when the tuner 1 receives the analog broadcast signal therein, the high-frequency switch 3 serves so as to electrically connect the input terminal 3c to the output terminal 3a. When the tuner 1 receives the digital broadcast signal therein, the high-frequency switch 3 serves so as to electrically connect the input terminal 3c to the output terminal 3b.

A first detector 4 for outputting an automatic gain control voltage (hereinafter called "first AGC voltage") corresponding to a first control voltage according to the level of the IF signal when the IF signal is inputted thereto, and a demodulator 5 for outputting a voice or speech signal and a video signal from the IF signal of the analog broadcast signal are electrically connected to the output terminal 3a. Thus, the IF signal is to be inputted to both the first detector 4 and the demodulator 5.

Here, the first detector 4 does not output the first AGC voltage when no IF signal is inputted thereto. On the other hand, when the IF signal is inputted thereto, the first detector 4 increases the first AGC voltage and outputs it therefrom as the level of the IF signal increases.

Similarly, a second detector 6 for outputting an automatic gain control voltage (hereinafter called "second AGC voltage") corresponding to a second control signal according to the level of the IF signal when the IF signal is inputted thereto, and a demodulator 7 for outputting a voice or speech signal and a video signal from the IF signal of the digital broadcast signal are electrically connected to the output terminal 3b. Thus, the IF signal is to be inputted to both the second detector 6 and the demodulator 7.

Here, the second detector 6 maximizes the second AGC voltage and outputs it therefrom when no IF signal is inputted thereto. Further, when the IF signal is inputted thereto, the second detector 6 reduces the second AGC voltage and outputs it therefrom as the level of the IF signal increases.

Further, the first AGC voltage outputted from the first detector 4 and the second AGC voltage outputted from the second detector 6 are inputted to a voltage converting circuit 8.

Here, the voltage converting circuit 8 comprises a first resistor 9, a second resistor 10 and a transistor 11. One end of the first resistor 9 is electrically connected to the second detector 6, whereas the other end thereof is electrically connected to the collector of the transistor 11. Further, the emitter of the transistor 11 is electrically grounded via the second resistor 10. A point where the first resistor 9 and the transistor 11 are electrically connected to each other, is electrically connected to the AGC voltage input terminal 1b of the tuner 1. Thus, the second AGC voltage outputted from the second detector 6 is inputted to the AGC voltage input terminal 1b of the tuner 1 through the first resistor 9.

Further, the first AGC voltage outputted from the first detector 4 is inputted to the base of the transistor 11.

The operation of the tuner 1 at the time that the tuner 1 receives the analog broadcast signal therein, will next be explained. First, the common terminal 3c of the high-frequency switch 3 is changed over to the switching terminal 3a to receive the analog broadcast signal. In doing so, the maximum value of the second AGC voltage is outputted from the second detector 6 because no IF signal is inputted to the second detector 6.

The analog broadcast signal inputted to the tuner 1 is converted into the IF signal by the mixer of the tuner 1, which in turn is outputted from the IF signal output terminal 1a, followed by input to the first detector 4 and the demodulator 5 through the high-frequency switch 3. The first detector 4 outputs the first AGC voltage therefrom according to the strength of the input IF signal. The first AGC voltage outputted from the first detector 4 is inputted to the base of the transistor 11.

In doing so, a current flows between the collector and emitter of the transistor 11 through the first resistor 9 according to the second AGC voltage. As a result, a voltage proportional to a voltage corresponding to the difference between the second AGC voltage (maximum value) and the first AGC voltage occurs in the collector of the transistor 11. This voltage is inputted to the gain variable amplifier 1c through the AGC voltage input terminal 1b of the tuner 1.

When the level of the analog broadcast signal received by the tuner 1 is now lowered, the level of the IF signal outputted from the tuner 1 is also reduced. Therefore, the AGC voltage outputted from the first detector 4 also decreases with its reduction.

Thus, since the first AGC voltage inputted to the base of the transistor 11 becomes low in level, the current that flows between the collector and emitter of the transistor 11 is also reduced. As a result, a collector voltage of the transistor 11 is inputted to the AGC voltage input terminal 1b of the tuner 1 in a high state. Thus, since the gain variable amplifier 1c of the tuner 1 amplifies the input analog broadcast signal greater, the level of the IF signal outputted from the tuner 1 and inputted to the demodulator 5 is held constant.

As a result, suitable speech and video signals are outputted from the demodulator 5.

Since the level of the outputted IF signal becomes high when the analog broadcast signal received by the tuner 1 increases in level, the first AGC voltage outputted from the first detector 4 increases with its level increase.

Thus, since the current flowing between the collector and emitter of the transistor 11 also increases, the voltage-converted second AGC voltage inputted to the tuner 1 becomes low. As a result, the amplification of the gain variable amplifier 1c of the tuner 1 is lowered to thereby amplify the input analog broadcast signal smaller, whereby the level of the IF signal outputted from the gain variable amplifier 1c of the tuner 1 and inputted to the demodulator 5 is kept constant. Consequently, suitable speech and video signals are outputted from the demodulator 5.

The operation of the tuner 1 at the time that the digital broadcast signal is received thereby, will next be described. First of all, the common terminal 3c of the high-frequency switch 3 is changed over to the switching terminal 3b to receive the digital broadcast signal. In doing so, no first AGC voltage is outputted from the first detector 4 because no IF signal is inputted to the first detector 4. Thus, since no voltage is applied to the base of the transistor 11, no current flows between the collector and emitter of the transistor 11. Accordingly, the second AGC voltage outputted from the second detector 6 is inputted to the AGC voltage input terminal 1b of the tuner 1 through the first resistor 9 as it is.

Since the level of the IF signal outputted from the tuner 1 is reduced when the state of reception of the digital broadcast signal received by the tuner 1 is deteriorated here, the AGC voltage outputted from the second detector 6 increases correspondingly.

Thus, since the second AGC voltage is inputted to the AGC voltage input terminal 1b of the tuner 1, the gain variable amplifier 1c of the tuner 1 greatly amplifies the input digital broadcast signal and hence the level of the IF signal outputted from the tuner 1 and inputted to the demodulator 7 is held constant.

As a result, suitable speech and video signals are outputted from the demodulator 7.

Further, since the level of the IF signal outputted from the tuner 1 becomes high when the state of reception of the digital broadcast signal received by the tuner 1 is improved, the second AGC voltage outputted from the second detector 6 is reduced correspondingly. Thus, since the gain variable amplifier 1c of the tuner 1 amplifies the input digital broadcast signal in small magnitude, the level of the IF signal outputted from the tuner 1 and inputted to the demodulator 7 becomes low. As a result, suitable speech and video signals are outputted from the demodulator 7.

Thus, the automatic gain control circuit can be constructed which is capable of easily receiving both the analog broadcast signal and the digital broadcast signal according to the changeover of the high-frequency switch 3 owing to the provision of the voltage converting circuit 8. Further, the automatic gain control circuit can perform changeover so as to correspond to both broadcast signals.

The automatic gain control circuit according to the present invention, as has been described above is provided with a tuner which is capable of receiving broadcast signals different in system from each other, and amplifies an intermediate frequency signal according to an increase or decrease in automatic gain control voltage when the automatic gain control voltage is inputted and outputs it therefrom, a first detector for outputting a first control voltage therefrom and increasing the first control voltage according to an increase in the level of the intermediate frequency signal when the intermediate frequency signal is inputted thereto, a second detector for outputting a second control voltage therefrom, outputting a voltage having the maximum value when no intermediate frequency signal is inputted thereto, and decreasing the second control voltage as the level of the intermediate frequency signal increases, a selector switch for selecting either the first detector or the second detector as a destination to output the intermediate frequency signal according to received broadcasts, and a voltage converting circuit for receiving the first control voltage and the second control voltage therein and thereby outputting the automatic gain control voltage therefrom. When the intermediate frequency signal is inputted to the second detector, the second control voltage is outputted to the tuner as the automatic gain control voltage. On the other hand, when the intermediate frequency signal is inputted to the first detector, a voltage increased or decreased according to an increase or decrease in the voltage corresponding to the difference between the maximum voltage outputted from the second detector and the first control voltage is outputted to the tuner as the automatic gain control voltage. Owing to such a construction, the receive switching between both broadcasts can be easily done by one switch.

According to the automatic gain control circuit of the present invention, the voltage converting circuit comprises a first resistor, a second resistor and a transistor. One end of the first resistor and the collector of the transistor are electrically connected to each other. The emitter of the transistor is grounded through the second resistor. The first control voltage is inputted to the other end of the first resistor and the second control voltage is inputted to the base of the transistor, whereby the automatic gain control voltage is outputted from the collector of the transistor. Thus, since mechanical switch means such as a relay or the like is not used, the switching between the AGC voltages can be done at low cost and without restrictions on an installation location of the automatic gain control circuit.

While the present invention has been described with reference to the illustrative embodiment, this description is not intended to be construed in a limiting sense. Various modifications of the illustrative embodiment will be apparent to those skilled in the art on reference to this description. It is therefore contemplated that the appended claims will cover any such modifications or embodiments as fall within the true scope of the invention.

What is claimed is:

1. An automatic gain control circuit, comprising:
   a tuner configured to receive broadcast signals of different systems and to amplify an intermediate frequency signal according to an increase or decrease in automatic gain control voltage when the automatic gain control voltage is inputted thereto and to output the same therefrom;
   a first detector which outputs a first control voltage increased as the level of the intermediate frequency signal increases, when the intermediate frequency signal is inputted thereto;
   a second detector which outputs a second control voltage maximal when the intermediate frequency signal is not inputted thereto and reduced as the level of the intermediate frequency signal increases when the intermediate frequency signal is inputted thereto;
   a selector switch which selects either said first detector or said second detector as a destination to output the intermediate frequency signal according to the received broadcasts; and
   a voltage converting circuit which receives said first control voltage and said second control voltage therein and outputs the automatic gain control voltage therefrom,
   wherein when the intermediate frequency signal is inputted to said second detector, said second control voltage is outputted to said tuner as the automatic gain control voltage, and when the intermediate frequency signal is inputted to said first detector, a voltage increased or decreased according to an increase or decrease in the voltage corresponding to the difference between said maximum second control voltage outputted from said second detector and the first control voltage is outputted to said tuner as the automatic gain control voltage.

2. The automatic gain control circuit according to claim 1, wherein said voltage converting circuit comprises a first resistor, a second resistor and a transistor, and one end of said first resistor is electrically connected to the collector of said transistor and the emitter of said transistor is grounded via said second resistor, and said second control voltage is inputted to the other end of said first resistor and said first control voltage is inputted to the base of said transistor, whereby said automatic gain control voltage is outputted from the collector of said transistor.

* * * * *